US010112144B2

(12) United States Patent
Milli

(10) Patent No.: US 10,112,144 B2
(45) Date of Patent: Oct. 30, 2018

(54) MODULE FOR SEPARATING NITROGEN WITH HOLLOW-FIBRE MEMBRANE

(71) Applicant: EUROSIDER S.A.S.DI MILLI OTTAVIO & C., Grosseto (IT)

(72) Inventor: Ottavio Milli, Grosseto (IT)

(73) Assignee: EUROSIDER S.A.S.DE MILLI OTTAVIO & C., Grosseto (IT)

( * ) Notice: Subject to any disclaimer, the term of this patent is extended or adjusted under 35 U.S.C. 154(b) by 0 days.

(21) Appl. No.: 15/111,927

(22) PCT Filed: Dec. 12, 2014

(86) PCT No.: PCT/IB2014/002900
§ 371 (c)(1),
(2) Date: Jul. 15, 2016

(87) PCT Pub. No.: WO2015/114400
PCT Pub. Date: Aug. 6, 2015

(65) Prior Publication Data
US 2016/0332109 A1  Nov. 17, 2016

(30) Foreign Application Priority Data

Feb. 3, 2014  (IT) ................. FI2014A0023

(51) Int. Cl.
*B01D 53/22* (2006.01)
*B01D 63/02* (2006.01)

(52) U.S. Cl.
CPC ........... *B01D 53/229* (2013.01); *B01D 53/22* (2013.01); *B01D 63/02* (2013.01);
(Continued)

(58) Field of Classification Search
CPC ........... B01D 2313/10; B01D 2258/06; B01D 53/22; B01D 2257/104; B01D 2256/10;
(Continued)

(56) References Cited

U.S. PATENT DOCUMENTS 4,329,157 A * 5/1982 Dobo ..................... B01D 53/22
  95/56
4,781,833 A * 11/1988 Mizutani ................ B01D 63/02
  210/321.81

(Continued)

FOREIGN PATENT DOCUMENTS

DE   34 35 883 A1   4/1986
EP   1 714 692 A1   10/2006
(Continued)

OTHER PUBLICATIONS

Johnson "The Benefits of a Nitrogen Painting System" https://www.fenderbender.com/articles/4119-the-benefits-of-a-nitrogen-painting-system Apr. 29, 2011 FenderBender 7 pages.*

(Continued)

*Primary Examiner* — Anthony R Shumate
(74) *Attorney, Agent, or Firm* — Young & Thompson

(57) ABSTRACT

A module for separating nitrogen from air via hollow-fiber membranes, includes a deflector (8) that communicates with the inlet hole (3) for the pressurized air and is arranged for deflecting the flow of compressed air into the module along paths of flow (9) having a direction that is not directly incident on the first end of the bundle of fibers (1).

20 Claims, 4 Drawing Sheets

(52) U.S. Cl.
CPC .... *B01D 2053/224* (2013.01); *B01D 2256/10* (2013.01); *B01D 2257/104* (2013.01); *B01D 2257/504* (2013.01); *B01D 2257/80* (2013.01); *B01D 2258/06* (2013.01); *B01D 2313/08* (2013.01); *B01D 2313/10* (2013.01); *Y02C 10/10* (2013.01)

(58) Field of Classification Search
CPC ............... B01D 2313/08; B01D 63/02; B01D 2053/224; B01D 2257/80; B01D 53/229; B01D 2257/504; Y02C 10/10
See application file for complete search history.

(56) References Cited

U.S. PATENT DOCUMENTS

| | | | | |
|---|---|---|---|---|
| 4,876,012 | A * | 10/1989 | Kopp | B01D 61/18 210/321.81 |
| 5,158,584 | A * | 10/1992 | Tamura | B01D 53/22 128/205.11 |
| 5,282,966 | A * | 2/1994 | Walker | B01D 63/02 210/321.8 |
| 6,171,374 | B1 * | 1/2001 | Barton | B01D 63/081 210/321.75 |
| 6,306,491 | B1 * | 10/2001 | Kram | B01D 69/00 424/422 |
| 6,395,066 | B1 * | 5/2002 | Tanihara | B01D 53/22 95/47 |
| 8,002,875 | B1 * | 8/2011 | Bossard | B01D 53/22 95/55 |
| 8,425,656 | B2 * | 4/2013 | Ciora, Jr. | F28F 1/405 95/43 |
| 9,675,755 | B2 * | 6/2017 | Shick | A61M 5/165 |
| 9,724,647 | B2 * | 8/2017 | Hosoya | B01D 63/106 |
| 2002/0031454 | A1 * | 3/2002 | Ooe | B01D 53/92 422/172 |
| 2003/0010205 | A1 * | 1/2003 | Bikson | B01D 46/003 95/52 |
| 2003/0075498 | A1 * | 4/2003 | Watkins | A61M 1/16 210/456 |
| 2004/0129637 | A1 * | 7/2004 | Husain | B01D 61/022 210/636 |
| 2005/0161388 | A1 * | 7/2005 | Williams | B01D 19/0031 210/321.8 |
| 2006/0243653 | A1 | 11/2006 | Heinrich et al. | |
| 2007/0084780 | A1 * | 4/2007 | Kuo | B01D 29/41 210/321.75 |
| 2007/0228602 | A1 | 10/2007 | Cote et al. | |
| 2008/0178735 | A1 * | 7/2008 | Barnette | B01D 53/22 95/45 |
| 2009/0272686 | A1 * | 11/2009 | Mabuchi | B01D 67/0011 210/500.23 |
| 2009/0320528 | A1 * | 12/2009 | Skarzenski | B23K 31/02 65/494 |
| 2011/0257788 | A1 * | 10/2011 | Wiemers | B01D 61/022 700/267 |
| 2012/0048109 | A1 * | 3/2012 | Chinn | B01D 53/228 95/130 |
| 2012/0048795 | A1 * | 3/2012 | Burr | B01D 65/00 210/321.87 |
| 2012/0151890 | A1 * | 6/2012 | Pearson | B01D 63/02 55/484 |
| 2014/0047982 | A1 * | 2/2014 | Fukuda | B01D 53/22 96/8 |
| 2014/0183126 | A1 * | 7/2014 | Chikura | B01D 63/12 210/454 |
| 2014/0260208 | A1 * | 9/2014 | Sato | B01J 37/0246 60/286 |
| 2014/0311340 | A1 * | 10/2014 | Snow, Jr. | B64D 37/00 95/45 |
| 2015/0000523 | A1 * | 1/2015 | Jojic | B01D 53/228 95/54 |
| 2016/0311551 | A1 * | 10/2016 | Daniello | B64D 37/32 |
| 2016/0312676 | A1 * | 10/2016 | Youssef | B01D 53/504 |

FOREIGN PATENT DOCUMENTS

| | | |
|---|---|---|
| WO | 02/098543 A1 | 12/2002 |
| WO | 2004/050221 A1 | 6/2004 |

OTHER PUBLICATIONS

International Search Report, dated Mar. 30, 2015, from corresponding PCT application.

* cited by examiner

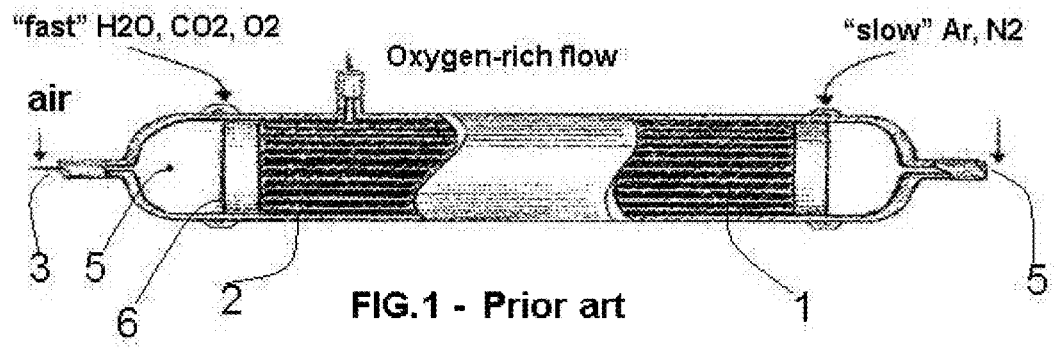
FIG.1 - Prior art
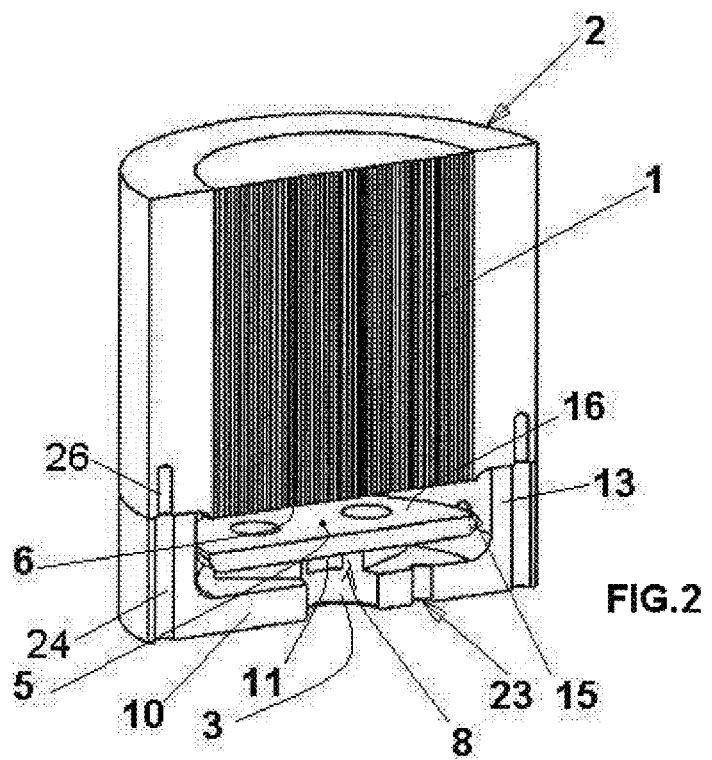
FIG.2

MODULE FOR SEPARATING NITROGEN WITH HOLLOW-FIBRE MEMBRANE

SECTOR OF THE INVENTION

The present invention relates to a hollow-fibre membrane for selective separation of nitrogen from a flow of pressurized air.

In particular, the apparatus finds application in apparatuses for production of nitrogen starting from compressed air to be used for painting with air systems, rotary-bell systems, or other systems operating at high, medium, or low pressure.

STATE OF THE ART

Known to the art and marketed for some time now are hollow-fibre-membrane nitrogen-separation modules that exploit the asymmetrical technology of hollow-fibre membranes for separating and recovering nitrogen from compressed air containing approximately 78% of nitrogen, 21% of oxygen, and 1% of other gases.

In particular, these membranes are able to produce high-purity nitrogen exploiting the principle of selective permeation whereby each gas has a characteristic permeation rate that is a function of its ability to dissolve and diffuse through a membrane.

The oxygen contained in the air is a "fast" gas and is selectively diffused through the wall of the membrane, whereas the nitrogen travels along the inside of the fibre, consequently creating a flow of product rich in nitrogen, whereas the gas enriched in oxygen, or permeate, is discharged from the membrane at atmospheric pressure.

Usually the delivery gas for a membrane system is compressed air at a pressure comprised between 4 and 30 bar(g), which may come from an air-supply system or from a dedicated compressor.

According to the origin, the air may contain various contamination agents, amongst which the most common are water and lubricants for compressors. There may also be present pollutant agents contained in the atmosphere, in particular in highly industrialized areas In greater detail, amongst the contaminants of the inlet air there may be distinguished components such as hydrogen, carbon monoxide, carbon dioxide, methane, acetylene, ethane, ethylene, propylene, propane, butane and heavier hydrocarbons, and material particles, which do not significantly damage the material of the membrane, but all permeate through the membrane to various degrees. In cases where the concentrations are particularly high, there could be, however, residue of contaminants in the outgoing flow of nitrogen gas, such as sulphur dioxide, hydrosulphuric acid, mercaptanes, ammonia, chlorides or chlorine, nitrogen oxides (NO or else $NO_2$), acid vapours, coal dust, smoke/soot, ozone, etc.

In the separator the compressed air flows along the inside of the hollow fibres. The "fast" gases—oxygen, carbon dioxide, and water vapour—and a small amount of "slow" gases pass through the wall of the membrane towards the outside of the fibres and are collected at atmospheric pressure as is the discharge flow or permeate.

The majority of "slow" gases and a very small amount of "fast" gases continues to travel through the fibre until it reaches the end of the membrane, where the nitrogen gas produced is made to exit for the application envisaged.

The air that enters the compressor hence entrains dust, contaminating agents present in the atmosphere and water vapour, but also oil aerosols, vapours and other solid particles due to wear of the compressor that may add to the flow of air supplied by the compressor.

From the structural standpoint, a typical membrane separator contains thousands of fibres gathered in bundles collected within a suitable container, or module, which protects the fibres and directs the gases properly from the source of air at inlet to the outlet for the separated gas. The membrane module, as is shown, is usually formed by a metal pipe, preferably made of aluminium or alloys thereof, or stainless steel, or else an ABS pipe, according to the characteristics of use. In an example of embodiment, the bundles are closed at both ends, for example by means of blocks of epoxy resin. In this type of separator, the ends of the bundles are cut, and the holes of the fibres are left free at both ends, enabling the gas to travel from one end to the other.

The inlet part for the compressed air is usually formed within a module by a chamber with a hole of various dimensions. When the valve that regulates introduction of the compressed air is opened, the fibres are impinged upon by the flow of inlet air, creating the so-called "fluid hammer" effect, leading to deformation and occlusion of the fibres impinged upon in so far as there does not exist a correct distribution of the air.

Consequently, the fibres involved can undergo in short time a deterioration that may be comprised between 10% and 20% of the productivity of the fibres due to the fluid-hammer effect and the contaminants or pollutant microparticles that may obstruct the microholes of the fibres themselves. This occurs above all when the inlet pressures of the compressed air are comprised between 4 and 30 bar(g).

In these conditions, in order to limit damage to the membranes, the compressed air should be treated to eliminate any possible condensed liquids, vapours in suspension, and solid particles prior to emission into the membrane separator, with a degree of filtration that depends upon the particular contaminating agents present and the final requirements of purity of the nitrogen.

The pre-treatment measures may usually include filtration and control of the final temperature and/or pressure.

However, known systems are not satisfactory and in any case entail a fast degradation of the fibres, with a marked reduction in the service life of the membrane modules with respect to their potential, and this, notwithstanding the complication of the system and the increase in costs due to the use of filters and external adjustments made to the membrane module.

PURPOSE OF THE INVENTION

A first purpose of the present invention is hence to propose a membrane separation module that will be free from the drawbacks referred to above and that will enable with minimal structural modifications considerable prolongation of the service life of the membranes.

SUMMARY OF THE INVENTION

The above and further purposes are achieved by an apparatus according to one or more of the annexed claims with a separation module that envisages a distribution of air at inlet to the membrane, said module being formed by a deflector or diffuser that prevents direct entry of air into the membrane and enables a perfect distribution of the flow of the air for a better control and uniformity of separation and a greater efficiency of the module itself. In addition, with the deflector it is possible to provide holes for inspection of the inside of the module that can be used with purposely provided endoscopic instruments for verifying the presence or otherwise of contaminating factors.

A first advantage of the invention lies in the fact that the membranes according to the invention have a prolonged service life and a greater efficiency in time of the module.

A further advantage is represented by the fact that the deflector prevents obstruction of the microholes of the fibres in the case where the air at inlet entrains organic contaminants such as oil particles.

A further advantage is represented by the fact that the deflector guarantees the performance of the module throughout the operating period without any reduction in quality or flowrate as a result of the uniformity of distribution of the compressed air at inlet.

A further advantage is represented by the fact that the deflector guarantees a long duration of the fibres doubling the terms of guarantee set down by the manufacturer, provided that the values of quality of the air indicated by the manufacturer are respected.

A further advantage is represented by the fact that the inspection holes can be connected to a sensor for warning the user of the presence of contaminants and hence indicating to him when it is necessary to clean the chamber for inlet of the air into the fibres.

A further advantage is represented by the fact that the deflector, by causing the compressed air entering the hollow fibres to flow in a uniform way, guarantees a constancy in the levels of consumption of air (energy cost per cubic meter per hour), eliminating the deterioration due to the contaminants that may impinge upon the part directly involved in the flow of air at inlet.

A further advantage is represented by the fact that the module can be thermally insulated with special paint in order to eliminate dissipation of heat of the membrane when the latter is heated in so far as the uniformity of the temperature throughout the external part of the module markedly improves the permeation of the fibres, thus guaranteeing better quality of the product and constancy of throughput.

LIST OF THE DRAWINGS

The above and further advantages will be better understood by any person skilled in the branch from the ensuing description and from the annexed drawings, which are provided by way of non-limiting example and in which:

FIG. 1 shows a compressed-air separation module of a conventional type;

FIG. 2 shows a partial cross-sectional and perspective view of a first embodiment of a module according to the invention;

DETAILED DESCRIPTION

Figure 3:
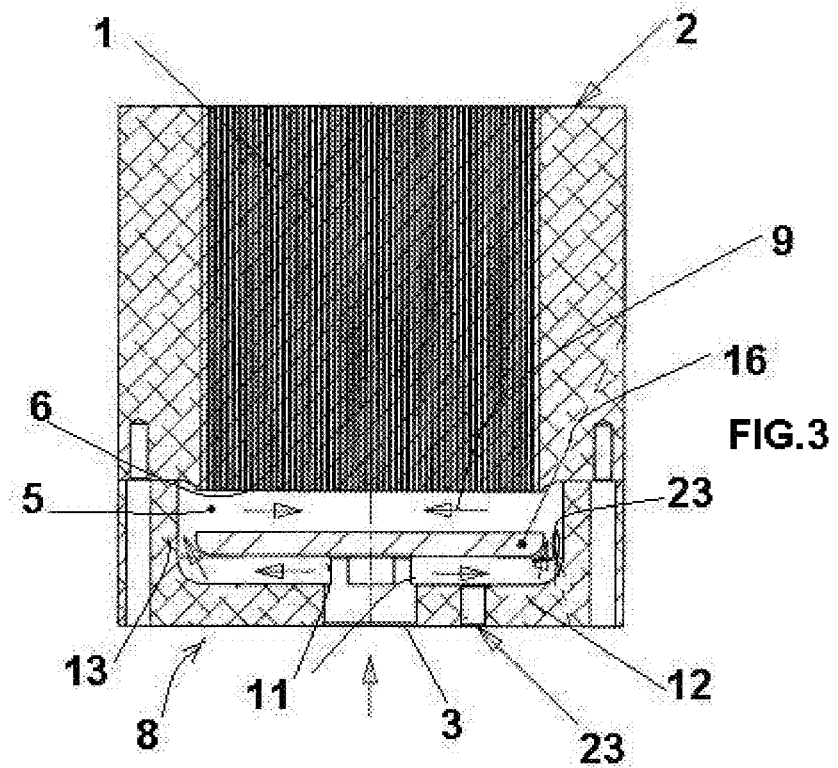
FIG. 3 shows a cross section of the module of FIG. 2.
Figure 4:
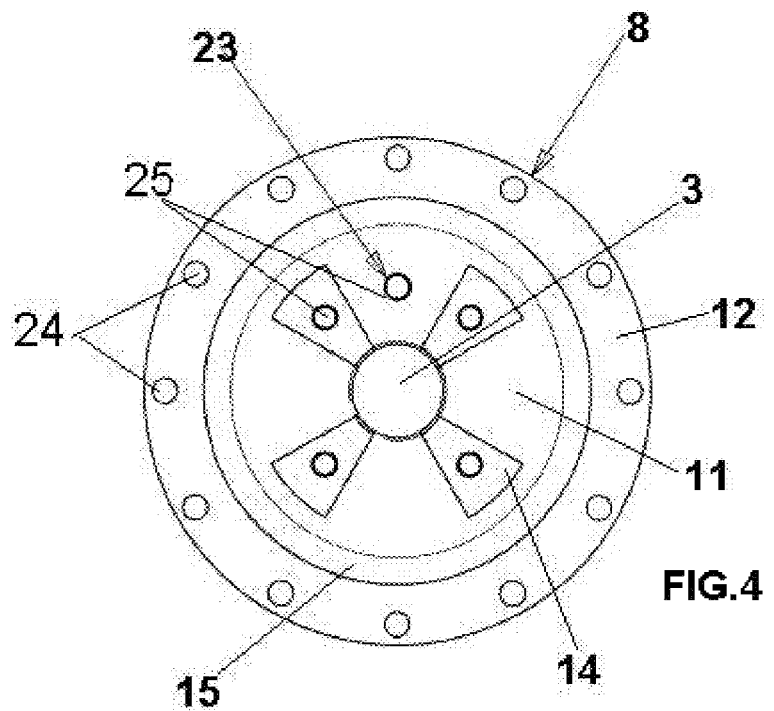
FIG. 4 shows a top plan view of a deflector for a module according to FIG. 2.
Figure 5:
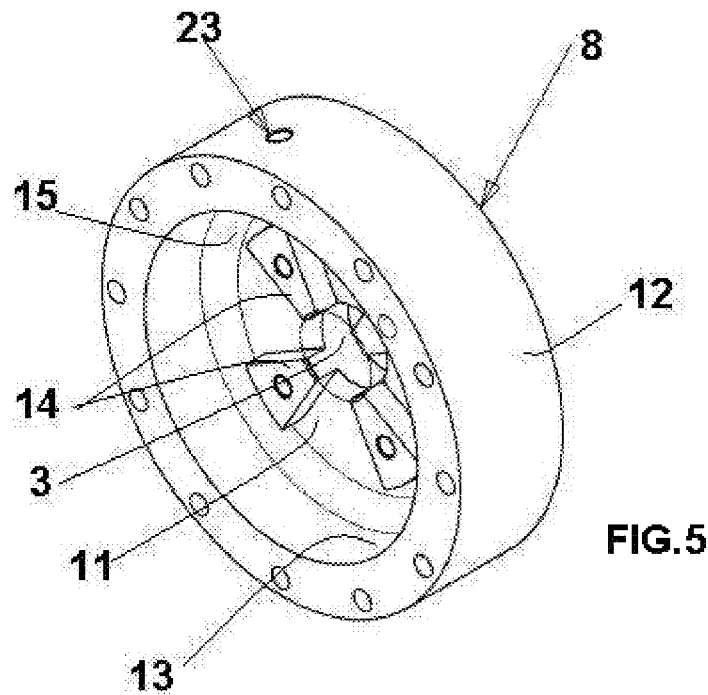
FIG. 5 shows the deflector of FIG. 4 in perspective view.
Figure 6:
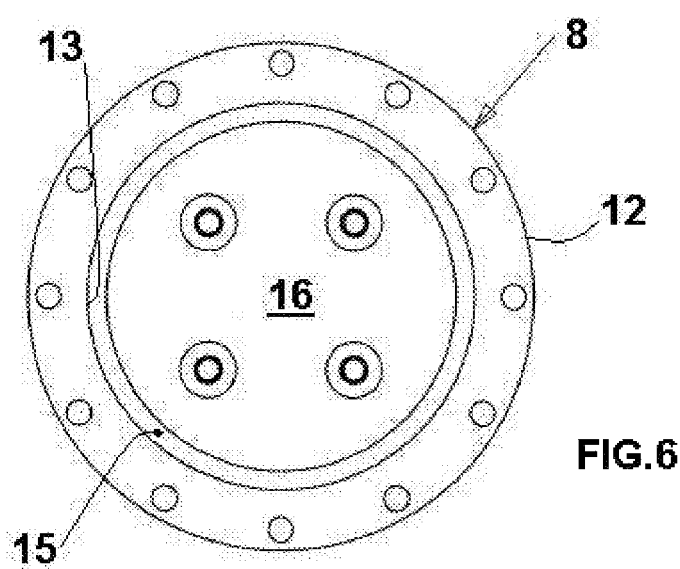
FIG. 6 shows a top plan view of a deflector according to FIG. 4 with a lid mounted thereon.

With reference to the attached drawings a module for separating nitrogen from air by means of hollow-fibre membranes is described, comprising a bundle of fibres 1 contained within an outer casing 2 so as to form a free space 5 comprised between an inlet hole 3 for a flow of pressurized air and a first end 6 of the bundle 1.

With reference in particular to FIG. 1, the casing 2 is provided at one end with at least one inlet hole 3, at the sides with intermediate outlets for the permeates (for example, distinct holes for fast permeates such as $H_2O$ and $CO_2$, for a flow rich in oxygen, and for slow permeates such as argon and nitrogen), and at the end opposite to the air inlet with a third hole 5 for outlet of the nitrogen that has been separated.

According to the invention, and with reference to FIGS. 2 to 8, the module comprises a deflector 8, which communicates with the inlet hole 3 and is arranged for deflecting the flow of compressed air within the space 5 along paths of flow 9 having a direction that is not directly incident on said first end of the bundle of fibres 1.

Advantageously, with this solution, the flow of pressurized air that enters the module does not impinge violently upon the inlet ends of the fibres and hence does not damage them, thus improving the performance thereof in time.

In the embodiment illustrated in FIGS. 2-6, the deflector 8 comprises a base body 10 provided in which are the inlet hole 3 and perpendicular radial channels 11 that communicate with the hole 3 itself and conduct the flow within the space 5 in directions substantially parallel to the face 6 of the bundle of fibres.

In greater detail, the base body may be shaped as a disk 12 delimited laterally by a flange 13 traversed by holes 24 for the passage of screws for fixing the body 10 to corresponding threaded seats 26 provided in the casing 2.

In the example illustrated, the channels 11 are provided in the form of circular sectors that are lowered with respect to the surface 14 of the disk that projects the most in the casing 2 and that extend between said inlet hole 3 and a peripheral circular channel 15 adjacent to the flange 13 that collects the flow of pressurized air and diffuses it into the peripheral space 5.

Preferably, the circular-sector channels 11 are closed at the top by a lid 16 that can be removed from the base body 10 and can be fixed thereto by means of screws 25.

Figure 7:
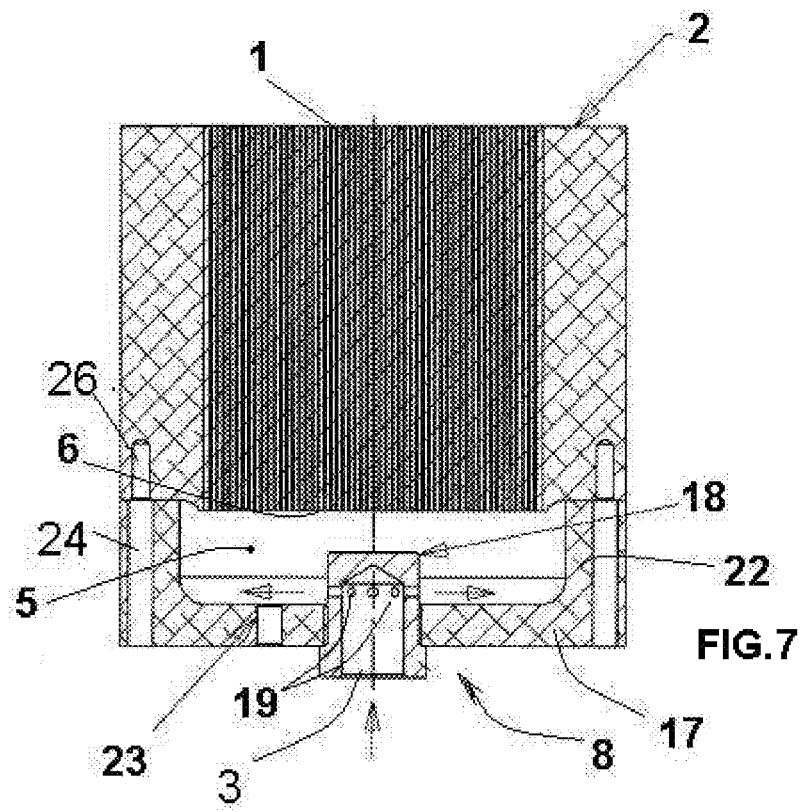
FIG. 7 shows in partial cross section a second embodiment of a module according to the invention.
Figure 8:
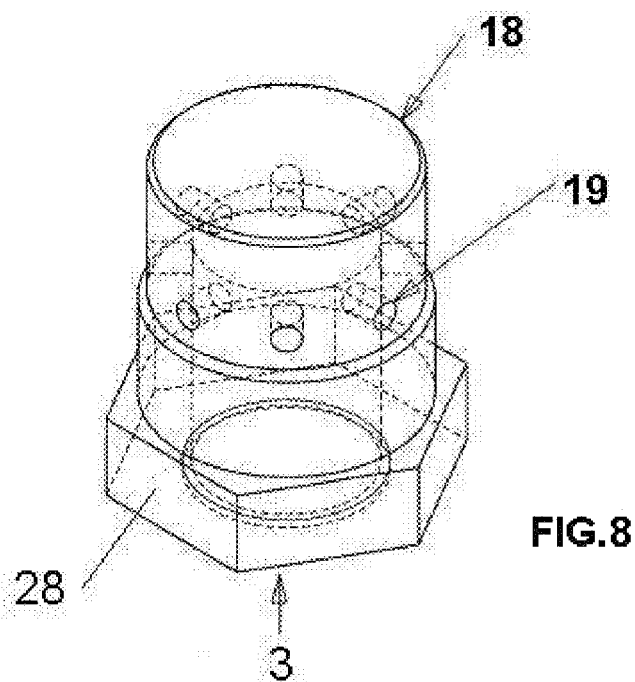
FIG. 8 shows the deflector of the module of FIG. 7 in perspective view.

In a second preferred embodiment, illustrated in FIGS. 7 and 8, the deflector 8 comprises a base body 17, in which there can be inserted a perforated cylindrical insert 18 provided in which is the inlet hole 3 in the form of a blind hole from which there diverge radial channels 19 that communicate with the hole 3 itself and with the space 5.

Also in this case, the flow of pressurized air enters the space 5 along paths that are not directly incident on the surface 6 of the fibres.

In greater detail, the base body 17 is provided in the form of a disk 21 delimited laterally by a flange 22 traversed by the holes 24 for the passage of the screws for fixing the body 10 to the threaded seats 26 of the casing 2.

Advantageously, the insert 18 is fixed in an easily removable way in the base body 17, for example, by means of a threaded coupling that can be tightened exploiting a hexagonal profile 28 of the insert 18 accessible from outside by an operator.

In either case, the deflector comprises inspection holes 23 that communicate with the free space 5 and extend in an axial and/or radial direction with respect to the bundle 1 in order to enable insertion of sensors or instruments for sampling the residue that has formed in the space 5.

The present invention has been described according to preferred embodiments, but equivalent variants may be devised without thereby departing from the sphere of protection of the invention.

The invention claimed is:

1. A module for separating nitrogen from air by means of hollow-fibre membranes, which comprises a bundle of hollow-fibre membranes for separating nitrogen from pressurized air (1) contained within an outer casing (2) provided at one end with at least one inlet hole (3) for a flow of pressurized air, at least one second intermediate hole (4) for outlet of the permeate gases, and a third hole (5) for outlet of the nitrogen that has been separated, said third hole (5) being set at the opposite end of the casing with respect to the inlet hole (3), wherein said bundle of fibres (1) forms a free space (5) comprised between the inlet hole (3) and a first end (6) of the bundle (1), said module comprising a deflector (8) communicating with the inlet hole (3, 20) and arranged for deflecting the flow of pressurized air within said space (5) along paths of flow (9) having a direction that is not directly incident on said first end of the bundle of fibres (1);

wherein said deflector (8) comprises a base body provided in which are the inlet hole (3) and radial channels (11) that are perpendicular to one another and that communicate with said inlet hole (3);

wherein said base body is shaped like a disk (12) delimited laterally by a flange (13) and said channels (11) are provided in the form of circular sectors lowered with respect to the top surface (14) of the disk and extending between said inlet hole (3) and a peripheral circular channel (15) adjacent to the flange (13); and wherein said sectors are closed at the top by a lid (16) that is removable from the base body.

2. The module according to claim 1, wherein base body is adapted to receive a perforated cylindrical insert (18) provided in which are a blind inlet hole (20) and said radial channels that communicate with said blind inlet hole (20) and with said space (5).

3. The module according to claim 2, wherein said base body is shaped like a disk delimited laterally by said flange and said insert (18) is fixed in a removable way in said base body.

4. The module according to claim 1, wherein said deflector comprises inspection holes (23) communicating with said free space (5).

5. The module according to claim 4, wherein said inspection holes (23) are made in an axial and/or radial direction with respect to the bundle (1).

6. The module according to claim 1, wherein said deflector is fixed to said casing (2) in a removable way.

7. The module according to claim 1, wherein the casing (2) is thermally insulated externally in order to eliminate dissipation of heat of the fibres (1) and render a temperature on an external part of the module uniform.

8. A module for separating nitrogen from air by means of hollow-fibre membranes, which comprises a bundle of hollow-fibre membranes for separating nitrogen from pressurized air (1) contained within an outer casing (2) provided at one end with at least one inlet hole (3) for a flow of pressurized air, at least one second intermediate hole (4) for outlet of the permeate gases, and a third hole (5) for outlet of the nitrogen that has been separated, said third hole (5) being set at the opposite end of the casing with respect to the inlet hole (3), wherein said bundle of fibres (1) forms a free space (5) comprised between the inlet hole (3) and a first end (6) of the bundle (1), said module comprising a deflector (8) communicating with the inlet hole (3, 20) and arranged for deflecting the flow of pressurized air within said space (5) along paths of flow (9) having a direction that is not directly incident on said first end of the bundle of fibres (1);

wherein said deflector (8) comprises a base body in which a perforated cylindrical insert (18) can be inserted provided in which are a blind inlet hole (20) and radial channels (19) that communicate with said blind inlet hole (20) and with said space (5).

9. The module according to claim 8, wherein said base body comprises the inlet hole (3) and said radial channels that are perpendicular to one another and that communicate with said inlet hole (3).

10. The module according to claim 9, wherein said base body is shaped like a disk (12) delimited laterally by a flange (13) and said channels (11) are provided in the form of circular sectors lowered with respect to the top surface (14) of the disk and extending between said inlet hole (3) and a peripheral circular channel (15) adjacent to the flange (13).

11. The module according to claim 10, wherein said sectors are closed at the top by a lid (16) that is removable from the base body.

12. The module according to claim 8, wherein said base body is shaped like a disk delimited laterally by a flange (22) and said insert (18) is fixed in a removable way in said base body.

13. The module according to claim 8, wherein said deflector comprises inspection holes (23) communicating with said free space (5).

14. The module according to claim 13, wherein said inspection holes (23) are made in an axial and/or radial direction with respect to the bundle (1).

15. The module according to claim 8, wherein said deflector is fixed to said casing (2) in a removable way.

16. The module according to claim 8, wherein the casing (2) is thermally insulated externally in order to eliminate dissipation of heat of the fibres (1) and render a temperature on an external part of the module uniform.

17. The module according to claim 9, wherein said deflector comprises inspection holes (23) communicating with said free space (5).

18. The module according to claim 9, wherein said deflector is fixed to said casing (2) in a removable way.

19. The module according to claim 9, wherein the casing (2) is thermally insulated externally in order to eliminate dissipation of heat of the fibres (1) and render a temperature on an external part of the module uniform.

20. The module according to claim 17, wherein said inspection holes (23) are made in an axial and/or radial direction with respect to the bundle (1).

* * * * *